United States Patent Office 3,655,611
Patented Apr. 11, 1972

3,655,611
COLD FLOW RESISTANT HOMOGENEOUS POLYMERS OF TETRAFLUOROETHYLENE AND HEXAFLUOROPROPENE AND PROCESS FOR PREPARING THEM
Max B. Mueller, Morristown, Peter P. Salatiello, Morris Plains, and Herman S. Kaufman, Teaneck, N.J., assignors to Allied Chemical Corporation, New York, N.Y.
Filed Aug. 9, 1968, Ser. No. 751,554
Int. Cl. C08f *15/06, 45/04*
U.S. Cl. 260—41
7 Claims

ABSTRACT OF THE DISCLOSURE

Granular homogeneous copolymers of tetrafluoroethylene and between about 0.05 mole percent and about 0.50 mole percent of hexafluoropropene having superior physical properties and adapted for molding into objects having enhanced resistance to cold flow under loads and process for preparing them.

---

This invention relates to moldable homogeneous copolymers of tetrafluoroethylene and hexafluoropropene and more particularly, to granular powders of such copolymers, having excellent moldability and high resistance to cold flow under loads, coupled with high tensile and high elongation characteristics, and to a process for preparing them.

Polytetrafluoroethylene possesses a number of unusual properties including chemical inertness, thermal stability, temperature and friction resistance characteristics, which have rendered it useful in the electrical and electronic industries for electrical insulation. Polytetrafluoroethylene is also widely used in the chemical industry for the production of molded gaskets and packing elements and for such other applications as hydraulic sealing components, back-up sealing cups, O-rings, bearings, piston rings and other miscellaneous components.

Valuable as this polytetrafluoroethylene polymer is for such uses, its applications have been limited, especially in the field of gasketing, by its tendency to "cold flow" under the prolonged application of compressive loads.

Some aleviation of "cold flow" has been effected by admixture with the polytetrafluoroethylene, of various reinforcing fillers such as powdered metals, glass fibers, asbestos, etc., whereby such cold flow tendencies are reduced.

The use of filled polymers, while satisfactory in certain applications, presents disadvantages in others, especially in certain chemical applications in which the polymeric article is subjected to the action of corrosive chemicals.

Attempts to provide copolymers having the combined properties of cold flow resistance and other necessary moldability properties and end product characteristics, have been largely unsuccessful, and have resulted in products in which one or more of the essential properties for such end uses, particularly gaskets, has been sacrificed. Such copolymers as have been prepared in the past have suffered from low tensile strengths and low percentage elongation values and/or tend to become thermally deteriorated when subjected to the standard sintering temperatures required in the production of molded gaskets.

It is an object of the present invention to provide granular molding powders of homogeneous copolymers of tetrafluoroethylene and hexafluoropropene, which, when subjected to conventional gasket manufacturing techniques, produce molded products of greatly enhanced resistance to cold flow as compared to the corresponding homopolymer, without significant deterioration in other essential gasket properties including tensile strength, percent elongation and thermal stability.

It is a further object of our invention to provide homogeneous copolymers of tetrafluoroethylene and hexafluoropropene having cold flow resistance properties equal to or better than many filled tetrafluoroethylene homopolymers reinforced with, for example, glass or bronze fillers, together with high tensile and high elongation characteristics.

These and other objects are accomplished according to our invention wherein homogeneous copolymers of tetrafluoroethylene with unusually small proportions of hexafluoropropene are provided.

Proportions of hexafluoropropene in the finished copolymer will range between about 0.05 mole percent and about 0.50 mole percent, preferably between about 0.1 mole percent and 0.50 mole percent hexafluoropropene (HFP) and between about 99.95 mole percent and about 99.5 mole percent tetrafluoroethylene (TFE), hexafluoropropene mole percentages between about 0.20 mole percent and about 0.30 mole percent being especially suitable.

In the drawings FIG. 1 illustrates the cold flow properties of a specific copolymer of the invention in comparison to filled and unfilled homopolymers.

Figure 1:
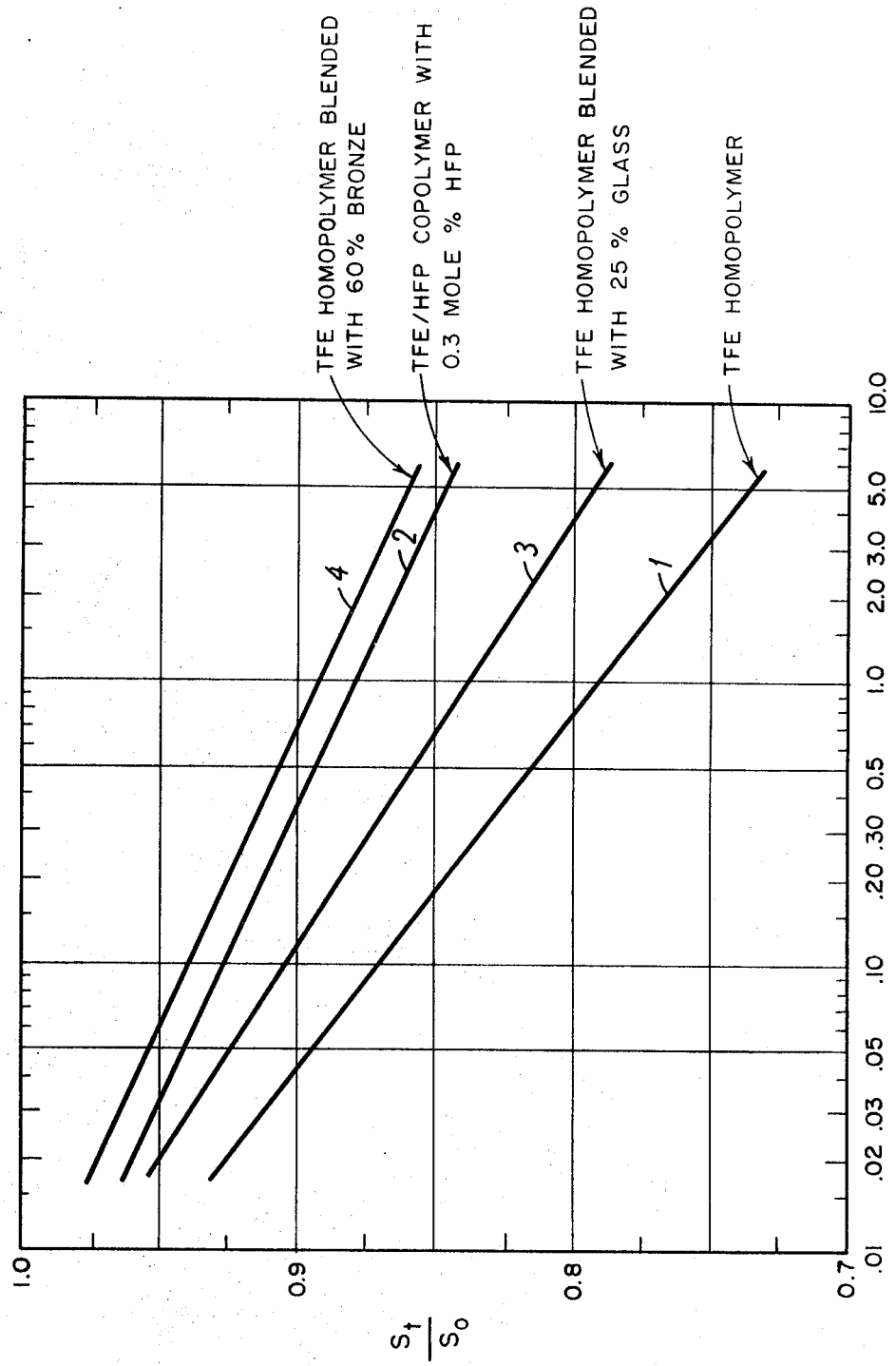

The term "cold flow" as used herein is defined as an irreversible deformation of the polymeric object under load. This cold flow tendency is one of the major faults of polytetrafluoroethylene (PTFE) grades currently available commercially. Thus, in order to utilize the valuable properties of PTFE such as thermal stability, chemical inertness, and low friction characteristics, fabricators of PTFE in many cases must add inert fillers such as glass, bronze and asbestos to the PTFE molding powders to produce parts relatively resistant to cold flow.

It is well known that polytetrafluoroethylene powders are available as products of two general kinds. A first group (1) comprises polytetrafluoroethylene granular powders having relatively large particle size, usually in excess of about 20 microns, usually with average particle size between about 25 microns and about 600 microns, providing a total surface per gram in the range of 1 to 4 square meters. These granular polymers are obtained by procedures which comprise polymerizing tetrafluoroethylene in contact with an aqueous medium containing a free radical initiator to obtain a slurry of polymer particles in non-water-wet form. A second type (2) of polytetrafluoroethylene, is produced in the form of powders of colloidal particle size, in the range of about 0.05 to 0.50 micron and having a total surface area per gram in the range of 9 to 12 square meters. This second type of polymer is obtained by polymerizing tetrafluoroethylene in aqueous medium containing a free radical initiator and a telogenically inactive dispersing agent to obtain an aqueous colloidal dispersion of polymer particles.

The copolymers of our invention belong to the first class of polymers, namely the granular powders. These are well adapted for compression molding purposes wherein shapes are formed by producing compression molded preforms which are then free-sintered at temperatures on the order of 716° F. (380° C.). The fine dispersion powders of the second type, i.e. the so-called "paste" polymers, on the other hand, are not suitable for general molding or compression molding as they tend to crack when preformed and free-sintered in attempts to make massive articles, and as they exhibit poor powders flow properties which render them difficult to process in automatic molding machines.

In order to be useful in the production of molded products such as gaskets, the first group of polymers referred to above, namely the granular polymeric materials, must be capable of providing, when molded by conventional techniques such as compression molding, a stable, shaped article or "preform" which will maintain its shape and dimensions and will resist cracking and deformation upon heating ("sintering") at the standard sintering temperature of 380° (716° F.) without the support of the mold, i.e. upon "free sintering." Moreover, the preform should not exhibit any appreciable thermal degradation as a result of exposure to such temperatures.

The resulting sintered objects must have high tensile strengths, and preferably high elongation values, and specifications for polytetrafluoroethylene often specify minimum tensiles and elongations. Thus, for example, according to the Society of Automotive Engineers Aerospace Material Specifications (AMS 3652 A) of 1966, the so-called "non-critical grade" of polytetrafluoroethylene for application primarily for gaskets and other parts where high mechanical or electrical characteristics are not required should have a tensile strength of at least 1500 and elongation of at least 100 (ASTM D–638). For the so-called "premium grades," the corresponding SAE specification (AMS 3661 of 3–15–66) requires tensiles of at least 3600, elongations of at least 270 for thin films up to 0.005 inch thickness; and tensiles of at least 4,000, elongations of at least 300 of films 0.005 inch and over.

The copolymers of our invention retain substantially undeteriorated, all the thermal, tensile elongation and good processing characteristics of the polytetrafluoroethylene homopolymers, and in addition, provide greatly enhanced resistance to cold flow over those of the homopolymers.

The hexafluoropropene copolymers provide tensile strengths of at least 3600, usually 3600 to 5000, together with elongations of at least about 270 usually 300–500 and possess greatly enhanced cold flow properties.

As a method of evaluating cold flow resistance of our polymers, we calculate a "cold flow index" derived by testing the various polymers according to a modification of ASTM test method F–38–T for measuring Stress Relaxation of gasket material. In preparing the specimen gaskets for testing for tensile, elongation and stress-strain properties, molded preforms are first prepared by pressing the polymeric granular molding powder into circular discs .0625" thick by 2⅛" in diameter, under a pressure of 3200 p.s.i. for 3 minutes. The discs are removed from the mold and "free sintered" at the standard temperature of 716° F. or at other specified temperatures, if desired, for a standard period, for example 2 hours. After cooling to room temperature (ca. 20° C.) at a rate of 2.2° F. per minute, one gasket sample, 2.00 inches outside diameter (O.D.), and 1.625 inches inside diameter (I.D.), is cut out from each disc providing a test specimen having one square inch of area.

For determining the cold flow properties, the test specimens are placed between two periferally open platens and compressed under a load of 2,000 p.s.i.g. by means of a strain bolt equipped with internal strain gauges designed to compensate for torque and temperature changes. The test sample is maintained under the constant strain produced by the initial compression, and while thus maintained, the decline or relaxation of stress with time is measured on a conventional strain gauge. From the data thus obtained a curve is drawn by plotting the ratio of the stress at a given time ($S_t$) to the initial stress ($S_o$) against log of elapsed time under compression. The slope of the resulting curve is a measure of the tendency of the sample to deform irreversibly under pressure, known as cold flow. The steeper the curve, the greater the cold flow. Thus a zero slope, i.e. a horizontal curve, would indicate zero cold flow. The numerical values used herein to designated "cold flow index" (CFI) represent 200 times the differences between the ratio $S_t/S_o$ at 0.1 hour after initial application of the 2,000 p.s.i. pressure on the sample and at 1 hour after initial application of such pressure, and can be written $$CFI = \left(\frac{S_t \ (0.1 \ \text{hour})}{S_o} - \frac{S_t \ (1.0 \ \text{hour})}{S_o}\right) \cdot 200$$

Referring to the drawings, the curves in FIG. I depict compressive stress relaxation $S_t/S_o$ measured as described above using 1/16" gaskets with initial stress of 2,000 p.s.i., over a period of 1 minute to 10 hours, (readings being taken at intervals of 1, 2, 3, 6, 15, 30 and 60 minutes, and hourly thereafter), of copolymers of tetrafluoroethylene and 0.3 mole percent of hexafluoropropene in comparison with similar values for a commercial tetrafluoroethylene homopolymer alone and filled respectively with 25% glass and 60% bronze.

Thus, curve 1 in FIG. 1 illustrates the cold flow properties of a typical polytetrafluoroethylene homopolymer showing a cold flow index of 16.1. Curve 2 illustrates the cold flow properties of a copolymer of 0.3 mole percent hexafluoropropene and 99.7% tetrafluoroethylene, with a CFI of 9.6. Curve 3 illustrates the cold flow properties of the standard TFE homopolymer of curve 1, blended with 25% glass fibers and having a CFI of 13.3. Curve 4 illustrates the cold flow properties of the same standard TFE homopolymer blended with 60% bronze powder and having a CFI of 9.7.

Figure 2:
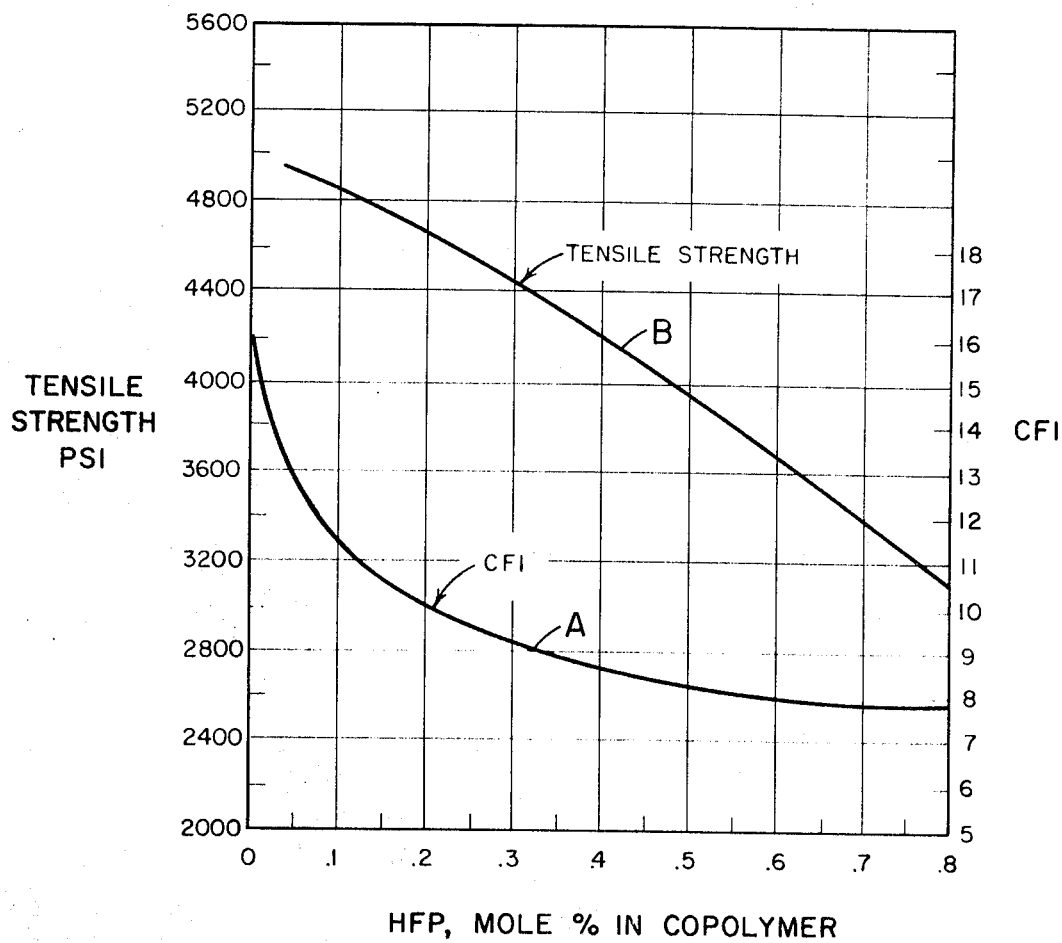
FIG. 2 shows two curves illustrating the variations in cold flow properties and tensile strength in copolymers of tetrafluoroethylene and hexafluoropropene (HFP) containing mole percentages of hexafluoropropene ranging from 0.00 mole percent to 0.8 mole percent.

In FIG. 2, curve A illustrates the variation in cold flow index of copolymers of hexafluoropropene and tetrafluoroethylene containing mole percentages of hexafluoropropene varying between 0.05 mole percent and 0.8 mole percent. Curve B illustrates the concomitant variation in tensile strengths of copolymers having the above compositions.

Figure 3:
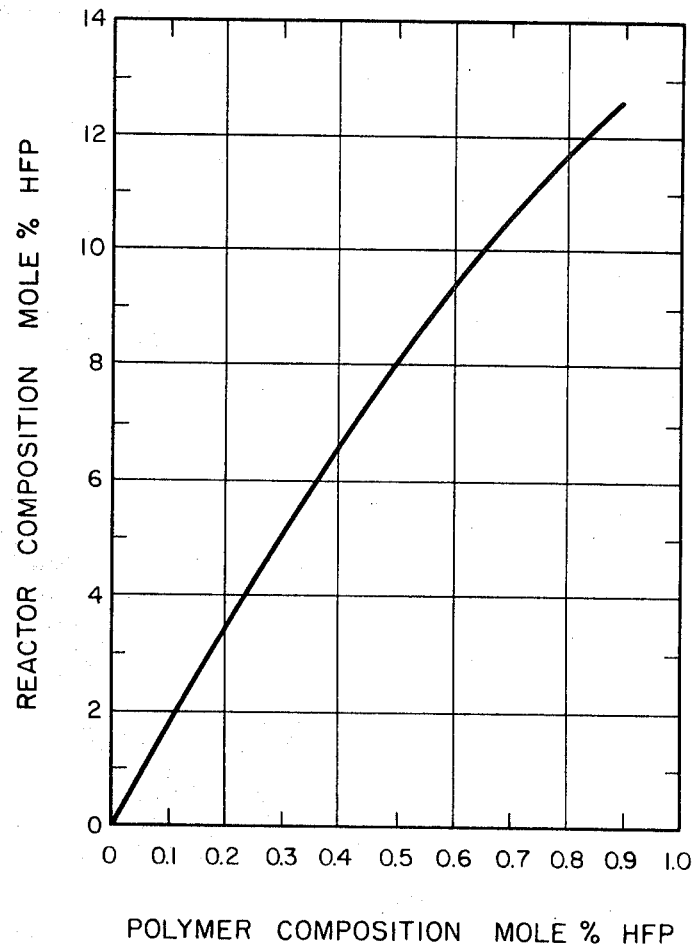
FIG. 3 shows a curve illustrating the variations in steady state compositions of the reacting mass and the steady state feed composition of comonomers necessary to produce homogeneous copolymers of tetrafluoroethylene and hexafluoropropene of final compositions between zero HFP (100% TFE) and 1.00% HFP and 99.00% TFE.

In FIG. 3, the single curve shows along its ordinate, the varying compositions of hexafluoropropene and tetrafluoroethylene which must be maintained in the reactor and the composition of the HFP-TFE feed mixture which must be supplied to obtain copolymers of the desired HFP composition within the range 0.00 mole percent to 1.0 mole percent HFP, the values for feed composition and for copolymer composition being the same and being shown on the curve's abscissa.

The new copolymers of our invention can be prepared by a modification of the conventional polymerization techniques of the character generally employed in the production of polytetrafluoroethylene granular molding powders, controlled to insure production of homogeneous copolymers. This is accomplished according to our invention by providing in the polymerization system, an initial mixture of gaseous tetrafluoroethylene and gaseous hexafluoropropene having proportions in the range between about 0.90 mole percent and about 8.0 mole percent hexafluoropropene, the balance tetrafluoroethylene, thereafter feeding to said system additional quantities of at least one of the gaseous comonomers, while concomitantly controlling the ratio of the partial pressure of hexafluoropropene to the sum of the partial pressures of hexafluoropropene and tetrafluoroethylene, to provide a constant, predetermined ratio of hexafluoropropene to tetrafluoroethylene within the above range of proportions. In general, a gaseous blend of tetrafluoroethylene and comonomer, hexafluoropropene, is charged to a reaction vessel containing deionized water, the components being introduced in such proportions as to provide the predetermined ratio of tetrafluoroethylene to hexafluoropropene vapors in the reactor required to produce homogenerous copolymers of the desired composition as shown in FIG. 3. This constant composition can be provided by first introducing an initial charge of TFE and HFP into the reactor in the proportions required to produce copolymers of the desired composition, and then maintaining this composition constant either by (I) feeding a mixture of monomer and comonomer in the same molar proportions as those in the polymer to be produced, or (II) feeding only TFE to the reactor containing the predetermined mixture, while concomitantly decreasing the reactor free volume at a rate calculated to maintain constant the ratio of the partial pressure of HFP to the sum of the partial pressures of HFP and TFE, to thus provide the desired constant molar proportions of the monomer and comonomer in the reactor free space.

In proceeding according to either modifiaction, I or II, the components are introduced into the reactor in amounts to produce an initial ratio of comonomer hexafluoropropene (A) to tetrafluoroethylene (B) dictated by the reactivity ratios $r_1$ and $r_2$ of the comonomers HFP and TFE, respectively, and the mole ratios of the two components desired in the copolymer ($a$ and $b$), according to the Equation I below.

$$\frac{a}{b} = \frac{r_1 \frac{A}{B} + 1}{r_2 \frac{B}{A} + 1} \qquad (I)$$

We have discovered that for the copolymer system hexafluoropropene (A) and tetrafluoroethylene (B), $r_1$ is effectively zero, (i.e. HFP will not detectably polymerize with itself), while $r_2$ (TFE) is effectively in the range from 15 to 18. In the TFE/HFP system, therefore, the equation becomes $$\frac{a}{b} = \frac{1}{r_2 \frac{B}{A} + 1} \qquad (II)$$

and this equation, when $r_2$ is 18 describes the curve shown in FIG. 3. The above Equation II, states that in a polymerizing system containing A mole fraction of HFP and B mole fraction of TFE, the composition of an incremental polymer product $\Delta P$, will consist of "$a$" mole fraction of HFP and "$b$" mole fraction of TFE.

In proceeding according to modification (I), the desired ratio of A to B in the polymerizing system, when once established, is readily maintained by feeding to the system a mixture of the two monomers in the precise proportion desired in the finished product and produces a product of homogeneous composition. This follows since when monomer equivalent in amount to the incremental polymer $\Delta P$ is replaced at a monomer ratio $a/b$, the polymerization system will maintain a steady state composition corresponding to $A/B$, and each successive incremental polymer product will contain copolymer units in the ratio of $a/b$ and such a copolymer will have a constant composition throughout and hence will be a homogeneous copolymer.

Any deviation in the relative proportions of comonomers in the polymerizing system whether caused by a variation in the proportions of comonomers in the feed or otherwise will cause the composition of the polymer product to vary and will thus produce a non-homogeneous product. For example, if monomer equivalent in amount to the incremental polymer $\Delta P$ is replaced at a monomer ratio of $A/B$ the polymerization system will change becoming richer in HFP. Therefore, no steady state will be reached and the successive incremental polymer products will have different compositions, successively richer in HFP and hence the product will be a non-homogeneous copolymer. In FIG. 3 are illustrated the relationships in terms of mole percents of the two components tetrafluoroethylene and hexafluoropropene, between (1) initial and steady state reactor composition; (2) feed composition and (3) composition of the finished copolymer necessary to produce homogeneous copolymers of the two comonomers in the composition range from 100 mole percent TFE and 0 mole percent HFP to 99 mole percent TFE and 1.0 mole percent HFP. Hence, to prepare homogeneous copolymers of tetrafluoroethylene and hexafluoropropene of any desired final composition within the indicated ranges, the selection of initial composition and feed composition of the two components will be governed by the Equation III $$a = \frac{A(1-A)}{2A(1-A) + r_2(1-A)^2} \qquad (III)$$

wherein "$a$" represents the mole fraction comonomer (HFP) desired in the finished copolymer and also the mole fraction comonomer in the feed mixture; A represents the mole fraction of comonomer in the initial charge and in the steady state composition of the polymerizing system; $r_2$ is the reactivity ratio of tetrafluoroethylene.

When proceeding by either modification I or II, there will be required as initial reactor charges, hexafluoropropene concentrations between about 0.9 mole percent and about 8.0 mole percent, depending on the final mole percent of copolymer desired. The total fluorocarbon partial pressures of between about 15 and about 500 p.s.i.a. are suitable, i.e. TFE partial pressures between about 13.8 and about 495.5 p.s.i.a. and HFP partial pressures between about 0.135 and about 40 p.s.i.a. In carrying out the polymerization, the reaction vessel contents are heated to a temperature in the range between about 30° C. and about 100° C. and a small quantity of a free radical initiator such as an alkali metal persulfate catalyst is added thereto to initiate the reaction. TFE and HFP in the desired proportions are charged to the reactor to the indicated partial pressure. In proceeding according to modification I, the reaction pressure is maintained by continuously charging the reaction vessel with a gaseous TFE/HFP blend of the desired final proportions, namely a blend of tetrafluoroethylene and hexafluoropropene of the relative proportions desired in the final copolymer, namely containing 0.05 mole percent to 0.50 mole percent hexafluoropropene, and 99.95 mole percent to 99.50 mole percent tetrafluoroethylene.

In proceeding according to modification II, after charging the gaseous monomers to the reactor in the desired ratios, the system is further pressured with nitrogen if necessary to bring the system to a total pressure within the preferred range between about 15 p.s.i.a. and about 500 p.s.i.a. This pressure is maintained during the reaction period while feeding tetrafluoroethylene alone to the reaction and concomitantly decreasing the volume of the free space of the reactor according to the dictates of Equation IV shown below $$\frac{V_k}{W} = \frac{RT}{P_T} \left( \frac{1}{100 r_2 + (1-r_2) X_I} \right) - \frac{1}{\rho} \qquad (IV)$$

wherein:

$X_I$ = initial and constant mole percent comonomer (HFP)
$\rho$ = density of copolymer in gms./cc.
T = reaction temperature in ° K.
$P_T$ = total pressure of reaction in atmospheres
R = standard gas constant (82.057)
$r_2$ = reactivity ratio of TFE (=18)
$V_k$ = volume correction in cubic centimeters (increment volume decrease)
W = grams of copolymer formed at any time The free volume decrease can be accomplished by any suitable means, and is conveniently accomplished by increasing the occupied volume of the reator as by introducing thereinto an inert liquid such as water at the rate dictated by above Equation IV.

At the end of the polymerization period of, for example, 1 to 24 hours, the feed of the gaseous monomer or monomer-comonomer blend into the polymerization zone is discontinued and the reaction vessel is vented. The granular product copolymer is washed with water, dried at temperatures below about 150° C., e.g. 100° C., and recovered as coarse granular agglomerates which can be deagglomerated by milling to granular powders having average particle sizes in the range of about 20 microns to about 600 microns or higher. The copolymer product is homogeneous throughout and has a composition dependent on the constant gas phase monomer composition maintained during the polymerization reaction. The copolymers exhibit all the essential, characteristic, thermal, chemical, mechanical and electrical properties of the TFE homopolymer and in addition, have markedly enhanced resistance to cold flow.

The copolymers of our invention can be employed without fillers to provide unfilled materials having cold flow resistances significantly superior to that of the TFE homopolymer and often equal to or better than prior art filled polymers. In terms of cold flow index (CFI) as defined, this superiority usually provides a CFI value in the copolymer of at least about 3 units less than that of the corresponding TFE homopolymer; frequently as much as 8 or more CFI units less than the homopolymer. Thus, a TFE homopolymer with a CFI index value of 16 can be modified to have a CFI of no greater than about 13, and often as low as 8.0 or less by copolymerization with the small proportions of the comonomer of our invention.

Our copolymers can also be employed in admixture with conventional thermally stable, particulate fillers such as glass and asbestos fibers and carbon and bronze powders, forming compositions which provide molded products having cold flow resistances superior to the prior art filled products. When fillers are used, they can be mixed with our copolymers in conventional proportions of between about 5% and about 60% by weight of the total composition. In the case of glass, carbon and asbestos fillers, proportions between about 5% and about 40%, preferably between about 15% and about 25% are suitable, and in the case of bronze powder filler proportions between about 40% and about 70%, especially between about 50% and about 60% by weight of the composition are preferred. The mixtures are blended by milling and are molded into shapes such as gaskets by pressing and sintering using substantially the technique described hereinabove for the preparation of test specimens.

The fact that hexafluoropropene, used in fractional mole percentages as comonomer in the polymerization of tetrafluoroethylene, produces such significant enhancement in resistance to cold flow of the resulting copolymers without appreciable damage to other desirable properties of the homopolymer, is extremely surprising, particularly in view of the fact that a great many other polymerizable unsaturated fluorinated hydrocarbons fail to produce a similar result.

Thus, the fluoroalkenes listed in Tables IA and IB below, when copolymerized with tetrafluoroethylene in the manner set forth herein, either showed no improvement in cold flow resistance or developed thermal instability at the required sintering temperature of about 716° F. (380° C.) and thus failed to produce copolymers commercially usable as gasket material because of this damage to the useful properties of the homopolymer. The thermally unstable copolymers decomposed by either curling of the gaskets or gassing and blistering of the discs. Table IA lists those copolymers which either failed to provide appreciably reduced cold flow over the corresponding homopolymer or developed unacceptably low tensile strengths. Table IB lists those comonomers which produced thermally unstable copolymers which decomposed at the sintering temperature of 716° F. and which were therefore useless for molding at these temperatures. Their cold flow indices could therefore not be measured.

TABLE IA.—COPOLYMERS OF TFE WHICH SHOWED LITTLE OR NO IMPROVEMENT IN COLD FLOW RESISTANCE (CFI) [1] OR HAD LOW TENSILES

| Comonomer | Mole percent comonomer | Specific gravity | CFI | Tensile, p.s.i. |
|---|---|---|---|---|
| None (typical TFE homopolymer) | None | 2.165 | 16 | 5,000 |
| $F_3C-N=O$ | 0.2 | 2.265 | 14.1 | 1,800 |
| $F_3C-N=O$ | 0.1 | 2.256 | 14.0 | 1,800 |
| $F_2C=CHF$ | 0.12 | 2.272 | 16.4 | [2] |
| $F_2C=CF-SF_5$ | 0.20 | 2.272 | 15.8 | [2] |
| $F_2C=CH_2$ | 0.25 | 2.286 | [3] 13.6 | [2] |
| (perfluorocyclobutene) | 0.20 | 2.261 | 12.9 | 900 |

[1] All samples sintered at 716° F. for 2 hours.
[2] Not tested.
[3] This sample was sintered in a nitrogen atmosphere with oxygen excluded.

TABLE IB.—COPOLYMERS OF TFE WHICH EXHIBITED THERMAL INSTABILITY

| Comonomer | Mole percent comonomer | Remarks |
|---|---|---|
| $F_2C=CCl_2$ | 0.20 | All samples decomposed by curling and blistering at standard sintering temperature of 716° F. for 2 hours. |
| $F_2C=CHF$ | 0.20 | |
| $FHC=CH_2$ | 0.20 | |
| $F_2C=CH_2$ | 0.185 | |
| $H_2C=CHCH_3$ | 0.30 | |
| $H_2C=C(CH_3)_2$ | 0.13 | |
| $H_2C=CHCl$ | 0.14 | |
| $F_2C=C(CH_3)OCH_3$ | 0.20 | |

In Table II below are shown the relative thermal stabilities of TFE/HFP copolymers of varying percentages HFP.

TABLE II

| HFP, mole percent | CFI | Thermal stability at 716° F. |
|---|---|---|
| 0 | 16.0 | Stable. |
| 0.23 | 9.7 | Do. |
| 0.27 | 9.4 | Do. |
| 0.29 | 9.2 | Do. |
| 0.36 | 8.8 | Do. |
| 0.46 | 8.4 | Slightly decomposed. |
| 0.82 | 7.3 | Decomposed. |

The thermal stability tests recorded in Table II above were carried out by forming molded gasket preforms by compressing at 3200 p.s.i. and subjecting the preforms to free sintering at 716° F. and visually observing the effect on the appearance of the sintered disc. "Decomposed" samples exhibited appreciable blistering and curling to an extent rendering them unsatisfactory for gasket use: "Slightly decomposed" samples exhibited by slight blistering and curling, to an extent insufficient to render them unsuitable for gaskets. "Stable" samples exhibited no visible deformation or blistering. It is apparent from the above Table II that TFE/HFP copolymers containing amounts of HFP appreciably in excess of 0.50 mole percent are unsuitable for gasket molding purposes because of their thermal instability.

The following specific examples further illustrate our invention. Parts are by weight except as otherwise noted.

EXAMPLE 1

Preparation of homogeneous copolymer containing 99.95 mole percent of tetrafluoroethylene and 0.05 mole percent of hexafluoropropene A 30 gallon, glass-lined high pressure reactor was charged with 21 gallons of deionized water and adjusted to pH 2.5 with 10% $H_2SO_4$. The reactor was evacuated, then charged with nitrogen until a slight positive pressure was reached. The reactor was then agitated and heated at 50° C. Then the nitrogen was evacuated and a solution consisting of 5.0 grams of potassium persulfate in 1 liter of deionized water was forced into the reactor. The vessel was then charged with a mixture of tetrafluoroethylene and hexafluoropropene having a composition of 0.90 mole percent of the hexafluoropropene to a partial pressure of 100 p.s.i.a. The reaction began after a five minute induction period and the reactor pressure was maintained at 100 p.s.i.a. partial pressure by the continuous addition, through a pressure regulating valve, of a mixture of tetrafluoroethylene and hexafluoropropene having a composition of 0.05 mole percent of the hexafluoropropene and 99.95% tetrafluoroethylene. After 1½ hours the reactor was quickly cooled and the monomer mixture in the reactor analyzed by gas chromatography. The analyses showed that the composition of the monomer mixture in the reaction is essentially unchanged during the course of the copolymerization. There was thus obtained a white, granular agglomerate mass at the rate of 0.52 lb./hr./gal. of a copolymer homogeneously composed of 0.05 mole percent hexafluoropropene and 99.95 mole percent of tetrafluoroethylene. The granular copolymer thus obtained was milled in a deagglomerating type mill, thus producing a granular polymer of average particle size of about 25 microns. The copolymer possesses properties equal in every way to that of commercial polytetrafluoroethylene but superior in cold flow resistance, as shown in Table III below. The cold flow resistance was almost identical to that of a standard polytetrafluoroethylene homopolymer which had been blended with 25% fiber glass, as shown in Table III.

EXAMPLE 2

Preparation of homogeneous copolymer containing 99.8 mole percent of tetrafluoroethylene and 0.2 mole percent of hexafluoropropene A 30 gallon, glass-lined high pressure reactor was charged with 21 gallons of deionized water and adjusted to pH 2.5 with 10% $H_2SO_4$. The reactor was evacuated then charged with nitrogen until a slight positive pressure was reached. The reactor was then agitated and heated at 65° C. Then the nitrogen was evacuated and a solution consisting of 5 grams of potassium persulfate in 1 liter of deionized water was forced into the reactor. The vessel was then charged with a mixture of tetrafluoroethylene and hexafluoropropene having a composition of 3.45 mole percent of the hexafluoropropene to a partial pressure of 300 p.s.i.a. The reaction began after a 5 minute induction period, and the reaction pressure was maintained at 300 p.s.i.a. partial pressure by the continuous addition, through a pressure regulating valve of a mixture of tetrafluoroethylene and hexafluoropropene having a composition of 0.2 mole percent of the hexafluoropropene. After two hours the reactor was quickly cooled to about 20° C., and the monomer mixture in the reactor analyzed by gas chromatography. The analyses showed that the composition of the monomer mixture in the reactor is essentially unchanged during the course of the copolymerization. There was thus obtained a white, granular material at the rate of 0.8 lb./hr./gal. which is a copolymer homogeneously composed of 0.2 mole percent hexafluoropropene and 99.8 mole percent of tetrafluoroethylene, particle size of about 25 microns after deagglomeration. The physical properties as compared to commercial grades of polytetrafluoroethylene are shown in Table III below. The cold flow index was 9.2 as compared to CFI's of 16 and 17.7, respectively, for two commercial grades of PTFE as shown in Table III. Thus, the tensile strength and elongation are comparable to the PTFE homopolymers, and better than glass or bronze filled PTFE homopolymers. The cold flow resistance is equal to PTFE homopolymer blended with 60% bronze.

EXAMPLE 3

Preparation of homogeneous copolymer containing 99.7 mole percent of tetrafluoroethylene and 0.3 mole percent of hexafluoropropene A 30 gallon, glass-lined, high pressure reactor was charged with 21 gallons of deionized water and adjusted to pH 2.5 with 10% $H_2SO_4$. The reactor was evacuated, then charged with nitrogen until a slight positive pressure was reached. The reactor was then agitated and heated at 65° C. Then the nitrogen was evacuated and a solution consisting of 5 grams of potassium persulfate ($K_2S_2O_8$) in 1 liter of deionized water was forced into the reactor. The vessel was then charged with a gaseous mixture of tetrafluoroethylene and hexafluoropropene having a composition of 4.3 mole percent of the hexafluoropropene and 95.7 mole percent tetrafluoroethylene to a partial pressure of 100 p.s.i.a. The reaction began after a 5 minute induction period and the reactor pressure was maintained at 100 p.s.i.a. partial pressure by the continuous addition, through a pressure regulating valve, of a mixture of tetrafluoroethylene and hexafluoropropene having a composition of 0.3 mole percent of the hexafluoropropene. After two and one-half (2½) hours the reactor was quickly cooled to about 20° C. and the monomer mixture in the reactor analyzed by gas chromatography. The analyses showed that the composition of the monomer mixture in the reactor was essentially unchanged during the course of the copolymerization. There was thus obtained a white, granular material at the rate of 0.8 lb./hr./gal. which is a copolymer homogeneously composed of 0.3 mole percent hexafluoropropene and 99.7 mole percent of tetrafluoroethylene.

The physical properties as compared to commercial grades of polytetrafluoroethylene homopolymer are shown in Table III below. The cold flow behavior as compared to commercial grades of PTFE is shown in FIG. 1. Thus, the tensile strength and elongation are similar to the PTFE homopolymers and better than glass or bronze-filled PTFE homopolymers. The cold flow resistance is equal to PTFE homopolymer blended with 60% bronze and better (lower) than the homopolymer of TFE or glass-filled PTFE homopolymer.

EXAMPLE 4

Preparation of homogeneous copolymer containing 99.5 mole percent of tetrafluoroethylene and 0.5 mole percent of hexafluoropropene In a manner similar to that described in Example 3 above, a gaseous mixture initially containing 91.9 mole percent tetrafluoroethylene and 8.1 mole percent hexafluoropropene was maintained at a partial pressure of 100 p.s.i.a. by the continuous addition of a mixture of tetrafluoroethylene 99.5 mole percent and hexafluoropropene 0.5 mole percent. A homogeneous copolymer was obtained at the rate of 0.3 lb./hr./gal. composed of 0.5 mole percent hexafluoropropene and 99.5 mole percent of tetrafluoroethylene. The physical properties of the resulting copolymer are shown in Table III below.

TABLE III

| Example No. | TFE polymer | Comonomer mole percent | Filler material | Specific gravity | Tensile, p.s.i. ASTM D-638 64-T | Elongation, percent D-1708 59-T | CFI, modified ASTM F-38-62T |
|---|---|---|---|---|---|---|---|
| 1 | TFE/HFP | 0.05 | 0 | 2.172 | 5,100 | 370 | 13.2 |
| 2 | TFE/HFP | 0.20 | 0 | 2.196 | 4,500 | 420 | 9.2 |
| 3 | TFE/HFP | 0.30 | 0 | 2.204 | 4,400 | 340 | 9.6 |
| 4 | TFE/HFP | 0.50 | 0 | | 3,900 | 485 | 8.2 |
| A | TFE homopolymer [1] | 0 | 0 | 2.17 | 4,000–6,500 | 300–450 | 16 |
| B | do [1] | 0 | 25% glass | 2.239 | 2,250 | 255 | 13.3 |
| C | do [1] | 0 | 60% bronze | 3.160 | 1,700 | 110 | 9.7 |
| D | TFE homopolymer [2] | 0 | 0 | 2.16 | 4,700 | 360 | 17.7 |
| E | do [2] | 0 | 25% glass | 2.226 | 2,550 | 240 | 13.4 |

[1] Halon-G-80.
[2] Teflon-T-7A.

EXAMPLE 5

In the manner described in Example 1 above, a series of six polymerizations were run to produce copolymers of tetrafluoroethylene (TFE) and hexafluoropropene (HFP) containing final mole percentages of hexafluoropropene varying between 0.04 mole percent and 0.81 mole percent.

In these runs 21 gallons of deionized water was charged to a steel autoclave and adjusted to pH 2.5 with sulfuric acid. After pressuring with nitrogen and heating to reaction temperature, 5 grams of potassium persulfate in 1 liter of water was forced into the reactor. The vessel was then charged with a mixture of tetrafluoroethylene and hexafluoropropane having the required initial mole percent HFP required as the starting point for producing copolymer of the desired final mole percent composition. Then a mixture of TFE and HFP of the desired final mole percent composition in the copolymer was fed into the reactor while maintaining partial pressure of 100 p.s.i.a. The copolymer as formed is deposited as a granular solid in the reactor. When the desired quantity of copolymer has accumulated, the reactor was cooled and opened. The resulting copolymers were milled to 20–30 micron particle size, formed into gaskets by preforming at 3200 p.s.i., sintering at 716° F., and were tested by the standard procedure (modified ASTM F-38-62T described above) for cold flow index (CFI), and for tensile and elongation (ASTM D-638) with results shown in Table IV below.

TABLE IV.—PROPERTIES OF HFP-TFE COPOLYMERS OF VARYING RELATIVE MOLE PERCENT HFP

| | Mole percent HFP | SSG | CFI | Tensile | Elongation |
|---|---|---|---|---|---|
| Control | 0.00 | 2.165 | 16.0 | 4,000–6,000 | 300–450 |
| Example No.: | | | | | |
| 5A | 0.04 | 2.172 | 13.2 | 5,100 | 370 |
| 5B | 0.10 | 2.200 | 10.4 | 4,600 | 470 |
| 5C | 0.30 | 2.204 | 9.6 | 4,500 | 450 |
| 5D | 0.45 | 2.209 | 8.4 | 3,900 | 480 |
| 5F | 0.58 | 2.214 | 8.1 | 3,600 | 390 |
| 5G | 0.81 | 2.211 | 7.5 | 3,200 | 450 |

It will be seen from the table that while cold flow properties improve (CFI decreases) with increasing mole percentage of HEP, tensile deteriorates and, at mole percentages above about 0.58 mole percent HFP, these tensiles are so low as to fail to meet the specifications for "premium grade" molding TFE.

EXAMPLE 6

The copolymers of Example 5B and 5C above containing respectively 0.10 mole percent and 0.30 mole percent hexafluoropropene respectively, the balance TFE, were blended with glass and bronze by milling.

The resulting filled copolymers were preformed into gaskets at 3200 p.s.i. and the resulting preforms were free sintered at 700° F. for 2 hours and measured for cold flow resistance and stress-strain properties. Results are shown in Table V below in comparison with similar blends of 100% TFE polymer as control.

TABLE V—EFFECT OF FILLERS ON PROPERTIES OF HFP/TFE COPOLYMERS

| Sample No | HFP, mole percent | Filler, kind | Filler, percent | Sinter T °F | CFI | Tensile, p.s.i. | Elongation, percent |
|---|---|---|---|---|---|---|---|
| Homopolymer, control | 0 | 0 | 0 | 716 | 16 | 4,500 | 350 |
| | 0 | Glass | 25 | 716 | 13 | 2,400 | 260 |
| | 0 | Bronze | 60 | 716 | 9 | 1,550 | 71 |
| 7B | 0.1 | 0 | 0 | 716 | 10.4 | 4,700 | 390 |
| | 0.1 | Glass | 25 | 700 | 8.1 | 2,200 | 230 |
| | 0.1 | Bronze | 60 | 700 | 5.0 | 1,300 | 13 |
| 7C | 0.3 | 0 | 0 | 716 | 9.6 | 4,500 | 450 |
| | 0.3 | Bronze | 60 | 700 | 5.1 | 1,600 | 260 |

It can be seen from Table V that both copolymers show considerably better (lower) cold flow indexes than the TFE homopolymer in both the glass and bronze blends and that tensile strengths and elongations are comparable.

EXAMPLES 7–11

In order to compare the properties of homogeneous and nonhomogeneous copolymers of TFE and hexafluoropropene of the same over-all HFP content, a series of five sets of copolymers were prepared at HFP concentrations ranging from 0.10 mole percent to 0.35 mole percent HFP with a homogeneous and a nonhomogeneous copolymer being produced at each concentration level.

In preparing the copolymers, the procedures were the same as those described in Example 1, except for the proportions of comonomers initially charged and fed to the reactor during the course of the polymerizations. In preparing the homogeneous copolymers, initial charges were determined according to the requirements of equation III (FIG. 3) to provide homogeneous copolymers of the desired comonomer composition. In preparing the nonhomogeneous copolymers, a 1-gallon stainless steel autoclave was first charged with 2000 grams of deionized water which was then adjusted to pH 2.5 with $H_2SO_4$. The reactor was evacuated, then 0.1 gram of potassium persulfate catalyst was added. The contents of the vessel were agitated and heated to 65° C. Then, the required amount of hexafluoropropene necessary to provide the desired over-all mole percent HFP in the final copolymer, was introduced into the autoclave followed by introduction of tetrafluoroethylene to a pressure of 200 p.s.i.g. The individual batches had the initial proportions of comonomers shown in Table VI below. After establishment of the desired vapor phase monomer composition, gaseous mixtures of TFE and HFP of the same composition were fed continuously to the autoclave to maintain the pressure constant at 20 p.s.i. during the polymerization reaction. When 400 grams of polymer had been prepared, the reaction was stopped, the autoclave was vented, the resulting granular, nonhomogeneous copolymer was recovered, ground wet to a powder, and dried overnight. Samples of the recovered copolymer were then analyzed for tensile, elongation, cold flow index, and stability. Details of the preparative procedures and results of the tests are shown in Table VI below.

It is apparent from Table VI that the nonhomogeneous copolymers are inferior to the homogeneous copolymers of similar over-all HFP content, in tensile strength, percent elongation, resistance to cold flow and in thermal stability.

by removing gas samples from the reactor after completion of the production of each successive 10 pounds of copolymer product, and analysing the gas chromatographically for HEP content.

The end of the run is signaled when the free gas volume space in the reactor has been so reduced as to reduce the rate of polymerization to nearly zero (as a result of the reduced partial pressure of TFE). At this point TABLE VI.—COMPARISON OF PREPARATION AND PROPERTIES OF HOMOGENEOUS AND NONHOMOGENOUS COPOLYMERS OF TFE AND HFP OF SIMILAR OVER-ALL HFP MOLE CONCENTRATIONS

| Example No. | HFP mole percent in initial charge | HFP mole percent in feed mixture | Overall HFP mole percent in copolymer | Tensile strength (p.s.i.) | Elongation (percent) | CFI | Thermal stability at 716° F. |
|---|---|---|---|---|---|---|---|
| Homogeneous copolymers | | | | | | | |
| 7 | 1.8 | 0.10 | 0.10 | 4,850 | 450 | 11.6 | Stable. |
| 8 | 2.6 | 0.15 | 0.15 | 4,760 | 465 | 10.7 | Do. |
| 9 | 3.5 | 0.20 | 0.20 | 4,660 | 480 | 10.0 | Do. |
| 10 | 4.3 | 0.30 | 0.30 | 4,440 | 490 | 9.2 | Do. |
| 11 | 5.9 | 0.35 | 0.35 | 4,320 | 490 | 8.8 | Do. |
| Nonhomogeneous copolymers | | | | | | | |
| 7A | 0.67 | 0.67 | 0.10 | 3,200 | 290 | 13.0 | Visually stable. |
| 8A | 1.0 | 1.0 | 0.15 | 3,350 | 295 | 12.1 | Do. |
| 9A | 1.3 | 1.3 | 0.20 | 4,050 | 310 | 11.8 | Unstable, decomposed. |
| 10A | 1.9 | 1.9 | 0.3 | 3,650 | 280 | 10.6 | Decomposed. |
| 11A | 2.1 | 2.1 | 0.35 | 3,300 | 240 | 9.8 | Do. |
| Control, TFE homopolymer. | 0.00 | 0.0 | 0.0 | 4,500 | 350 | 16.0 | Stable. |

EXAMPLE 12

Into a reactor having a total volume of 44 gallons (166.5 liters) equipped with a crowfoot agitator, was charged 20.5 gallons of deionized water. The vessel was then evacuated and purged with nitrogen. The charge was then heated to 65° C. with agitation under a blanket of nitrogen. Then 5 grams of potassium persulfate in 0.5 gallon of water was added to the charge (making a total of 21 gallons, [or 79.42 kg.], of water, leaving a free volume of 87.0 liters). The reactor was then evacuated. Gaseous hexafluoropropane was then introduced in the amount of 119 grams followed by introduction of nitrogen to a pressure of 68.45 p.s.i.a. Then gaseous tetrafluoroethylene was introduced in sufficient amount to bring to total reactor pressure to 165 p.s.i.a. Thus, of the total pressure of 165 p.s.i.a., 96.55 p.s.i.a. represents the partial pressure of TFE; 3.45 p.s.i.a. represents the partial pressure of HFP and 65 p.s.i.a. represents nitrogen pressure. The agitator was then started and polymerization was begun. As soon as a 10 p.s.i.a. pressure drop was observed, indicating initiation of the polymerization (a period of about 6 minutes), introduction of gaseous tetrafluoroethylene was commenced at a rate sufficient to provide, and maintain constant, reactor pressure of 165 p.s.i.a., the pressure required to provide the mole ratio of 3.45 mole percent of HFP and 96.55 mole percent of TFE necessary to produce a copolymer containing 0.2 mole percent HFP. Concomitantly with the start of TFE feed, introduction of additional water was commenced and was continued at a rate calculated from Equation IV to maintain the mole ratio of HFP to TFE in the free vapor-containing space of the reactor constant at the desired mole ratio of 3.45 (±0.2) mole percent HFP, the balance TFE, that is, a rate of 1.15 grams of water per gram of copolymer produced. The composition of the two gaseous monomers in the free space of the reactor was monitored during the course of the reaction the reactor was vented and the granular polymer, which was distributed in small particles throughout the liquid phase, was collected by filtration.

Reaction conditions and reactor gas compositions during the course of the run are shown in Table VII below.

TABLE VII.—REACTOR GAS COMPOSITIONS AND REACTION CONDITIONS USED IN THE PRODUCTION OF HOMOGENEOUS COPOLYMERS OF TFE AND HFP CONTAINING 0.20 MOLE PERCENT HFP

| | Total monomer charge, grams | Mole percent HFP | Mole percent TFE | Grams water added per g. polymer produced | Steady state polymerization rate [1] | Total time, min. | HFP analysis, mole percent in free volume of reactor after production of indicated amounts of polymer in pounds | | | | | | |
|---|---|---|---|---|---|---|---|---|---|---|---|---|---|
| | | | | | | | Initial 0 | 10 | 20 | 30 | 40 | 50 | 60 |
| Run 17 | 119 | 3.45 | 96.55 | 1.15 | 0.69 | 280 | 3.55 | 3.5 | 3.3 | 3.3 | 3.3 | 3.3 | 3.5 |

[1] Pounds polymer per hour per gallon (3.782 kg.) of water.

The finished copolymer was dried, milled and tested for physical properties. It was found to have cold flow index of 10.3, tensile strength of 4000 and a percent elongation of 290.

EXAMPLE 13

Two stopcock fittings one (A) made from a standard tetrafluoroethylene homopolymer, the other (B) made from tetrafluoroethylene/hexafluoropropene homogeneous copolymer containing 0.2 mole percent HFP, were tested under commercial conditions by fitting them into gas lines carrying air and nitrogen respectively at 125 p.s.i.g. pressure and temperature of 90° C. Gases were continuously passed through the lines until failure occurred as denoted by leakage at the stopcock. Results are shown in Table VIII below.

TABLE VIII

| Fitting | Polymeric material | Gas | Failure time, hrs. at 90° C. and 125 p.s.i.g. |
|---|---|---|---|
| ⅛" stopcock | TFE/HFP | Air | 45 |
| | TFE/HFP | Nitrogen | 48 |
| | TFE | Air | 0.5 |
| | TFE | Nitrogen | 0 |

It is apparent from the above that our TFE/HFP copolymers can be used effectively as stopcock fittings whereas TFE homopolymers are unsuitable for this purpose.

EXAMPLE 14

Valve stem packings rings of TFE homopolymer and homogeneous TFE/HFP copolymer, containing 0.2 mole percent HFP were tested in a liquid chlorine environment.

The TFE packing rings permitted leaking with the valve in either open or closed position unless pressure was applied around the valve stem by tightening of the packing nut. Application of pressure caused the valve to bind and be hard to turn. When the TFE/HFP copolymer ring was used, tightening of the packing nut was not necessary, so that high torques were not required to operate the valves.

While the foregoing describes the preferred embodiment of our invention, it will be understood that departures can be made therefrom within the scope of the specification and claims.

We claim:

1. A homogeneous tetrafluoroethylene copolymer granular molding powder, thermally stable on sintering at 716° F. for two hours, having a particle size of 25 to 600 microns, said copolymer consisting of between about 99.95 mol percent and about 99.50 mol percent of tetrafluoroethylene and between about 0.05 mol percent and about 0.50 mol percent of hexafluoropropene, said molding powder providing after molding and sintering a tensile strength of at least about 3,600 p.s.i., elongation of at least about 270%, and a cold flow index value at least about 3 units less than that of the corresponding homopolymer of tetrafluoroethylene, said molding powder having been obtained by copolymerizing an initial mixture of gaseous tetrafluoroethylene and hexafluoropropene in proportions of between about 0.9 and 8.0 mol percent hexafluoropropene, and thereafter feeding to the polymerization system additional quantities of at least one of the gaseous comonomers, while concomitantly controlling the ratio of the partial pressure of hexafluoropropene to the sum of the partial pressures of hexafluoropropene and tetrafluoroethylene, to provide a constant, predetermined ratio of hexafluoropropene to tetrafluoroethylene.

2. The copolymer of claim 1 wherein the hexafluoropropene is present in an amount between about 0.20 mole percent and 0.30 mole percent.

3. The composition of claim 1 in admixture with between about 5% and 70% by weight of a thermally stable particulate filler.

4. The composition of claim 3 wherein the filler is bronze powder and is present in an amount between about 40% and about 70% by weight of the total composition.

5. The composition of claim 3 wherein the filler is glass fibre and is present in an amount between about 5% and about 40% by weight of the total composition.

6. In a process for preparing a granular copolymer of tetrafluoroethylene and hexafluoropropene in an aqueous suspension polymerization system, the steps which comprise providing in said polymerization system an initial mixture of gaseous tetrafluoroethylene and gaseous hexafluoropropene having proportions in the range between about 0.90 mole percent and about 8.0 mole percent of hexafluoropropene and the balance tetrafluoroethylene, thereafter feeding to said system additional quantities of tetrafluoroethylene while concomitantly controlling the ratio of the partial pressure of HFP to the sum of the partial pressures of HFP and TFE to provide a constant predetermined ratio of hexafluoropropene to tetrafluoroethylene in the free reactor space within the above-mentioned range, feeding tetrafluoroethylene alone to the reaction while concomitantly decreasing the volume of said free space according to the equation $$\frac{V_k}{X} = \frac{RT}{P_T}\left(\frac{1}{100 r_2 + (1 - r_2) X_I}\right) - \frac{1}{\rho}$$

wherein
$X_I$ = initial and constant mole percent comonomer (HFP)
$\rho$ = density of copolymer in gms./cc.
T = reaction temperature in ° K.
$P_T$ = total pressure of reaction in atmospheres
R = standard gas constant (82.057)
$r_2$ = reactivity ratio of TFE (=18)
$V_K$ = volume correction in cubic centimeters (increment volume decrease)
W = grams of copolymer formed at any time
whereby a homogeneous copolymer of tetrafluoroethylene and hexafluoropropene is produced having a mole percent of hexafluoropropene content within the range between about 0.05 mole percent and about 0.50 mole percent.

7. The process according to claim 6 wherein the volume decrease is achieved by the introduction of water into the system.

References Cited

UNITED STATES PATENTS

| | | | |
|---|---|---|---|
| 2,598,283 | 5/1952 | Miller | 260—87.5 A |
| 2,943,080 | 6/1960 | Bro | 260—87.5 A |
| 2,952,669 | 9/1960 | Bro | 260—87.5 A |
| 3,331,822 | 7/1967 | Kometani et al. | 260—87.5 A |
| 3,350,373 | 10/1967 | Sianesi et al. | 260—87.5 |

OTHER REFERENCES

Billmeyer, Fred W., Textbook of Polymer Chemistry, Interscience Pub., Inc., New York, 1957, p. 239, QD 281 P6B5 C. 3.

The Chemistry of Acrylonitrile, 2nd edition, American Cyanamid Co., Petrochemicals Dept., New York, 1959, pp. 32–33, QD 401 A52 1959 C. 5.

ALLAN LIEBERMAN, Primary Examiner

J. H. DERRINGTON, Assistant Examiner

U.S. Cl. X.R.

252—12, 12.4; 260—87.5 A